(12) United States Patent
Saegusa

(10) Patent No.: US 12,174,155 B2
(45) Date of Patent: Dec. 24, 2024

(54) RIGIDITY CHARACTERISTIC MEASUREMENT METHOD AND RIGIDITY CHARACTERISTIC MEASUREMENT DEVICE

(71) Applicant: PRGR Co., Ltd., Tokyo (JP)

(72) Inventor: Hiroshi Saegusa, Tokyo (JP)

(73) Assignee: PRGR Co., Ltd., Kanagawa (JP)

( * ) Notice: Subject to any disclaimer, the term of this patent is extended or adjusted under 35 U.S.C. 154(b) by 427 days.

(21) Appl. No.: 17/755,035

(22) PCT Filed: Sep. 24, 2020

(86) PCT No.: PCT/JP2020/035991
§ 371 (c)(1),
(2) Date: Apr. 19, 2022

(87) PCT Pub. No.: WO2021/079678
PCT Pub. Date: Apr. 29, 2021

(65) Prior Publication Data
US 2022/0268678 A1 Aug. 25, 2022

(30) Foreign Application Priority Data
Oct. 21, 2019 (JP) ................................ 2019-191702

(51) Int. Cl.
*G01N 3/303* (2006.01)
*G01M 5/00* (2006.01)

(52) U.S. Cl.
CPC ............ *G01N 3/303* (2013.01); *G01M 5/005* (2013.01)

(58) Field of Classification Search
CPC .............................. G01N 3/303; G01M 5/005
See application file for complete search history.

(56) References Cited

U.S. PATENT DOCUMENTS

| 6,837,094 B2 | 1/2005 | Pringle et al. |
| 2007/0125152 A1* | 6/2007 | Brankov ................ G01N 3/303 73/12.01 |
| 2018/0318666 A1 | 11/2018 | Morales et al. |

(Continued)

FOREIGN PATENT DOCUMENTS

| JP | H0854329 A | 2/1996 |
| JP | 2004-033626 A | 2/2004 |
| JP | 2005-312734 A | 11/2005 |

(Continued)

OTHER PUBLICATIONS

The Royal and Ancient Golf Club of St Andrews and United States Golf Association, "Technical Description of the Pendulum Test—Revised Version", Discussion of points raised during Notice & Comment period (Nov. 2003).

*Primary Examiner* — Paul M. West
(74) *Attorney, Agent, or Firm* — Thorpe North & Western

(57) ABSTRACT

A stiffness characteristic measurement device holds a golf club head with a face surface facing upward, drops a collision rod vertically toward the face surface, and calculates the stiffness characteristic of the golf club head based on a detection value of an accelerometer attached to the collision rod. Every time the measurement point on the face surface is changed, a drop distance changing step of adjusting the drop distance of the collision rod is performed so that the collision velocity of the collision rod to the measurement point is substantially constant.

16 Claims, 13 Drawing Sheets

(56) References Cited

U.S. PATENT DOCUMENTS

2021/0162284 A1    6/2021  Saegusa

FOREIGN PATENT DOCUMENTS

| | | | | |
|---|---|---|---|---|
| JP | 2019-030407 A | | 2/2019 | |
| JP | 2019-030505 A | | 2/2019 | |
| KR | 2012064799 A | * | 6/2012 | ............. G01M 7/08 |
| TW | 2019-10747 A | | 3/2019 | |
| WO | 2019/030973 A1 | | 2/2019 | |

* cited by examiner (A)

| MEASUREMENT POINT (mm) | CONSTANT HEIGHT | | CONSTANT VELOCITY | |
|---|---|---|---|---|
| | COLLISION VELOCITY | CT VALUE | COLLISION VELOCITY | CT VALUE |
| −20 | 0.33 | 243.6 | 0.40 | 240.9 |
| −10 | 0.38 | 250.1 | 0.40 | 249.3 |
| 0 | 0.40 | 255.2 | 0.40 | 255.0 |
| 10 | 0.39 | 254.2 | 0.40 | 254.0 |
| 20 | 0.38 | 250.8 | 0.40 | 250.3 |

(B)

(A)

(B)

(A)

(B)

(C)

RIGIDITY CHARACTERISTIC MEASUREMENT METHOD AND RIGIDITY CHARACTERISTIC MEASUREMENT DEVICE

TECHNICAL FIELD

The present technology relates to a stiffness characteristic measurement method and a stiffness characteristic measurement device for measuring the stiffness characteristic of a collision target object.

BACKGROUND ART

Conventionally, a technique for measuring a stiffness characteristic such as a CT (characteristic time) value and a coefficient of restitution as an index that affects the restitution performance of a hitting tool such as a golf club head is known.

In particular, in golf clubs for competition, the CT value measured by a pendulum test set by the USGA (United States Golf Association) is used as an evaluation reference value of the stiffness characteristic. The procedure of the pendulum test is described in detail in "Technical Description of the Pendulum Test (Revised Version)", The Royal and Ancient Golf Club of St Andrews and United States Golf Association, November, 2003.

U.S. Pat. No. 6,837,094 discloses a device used for performing the pendulum test, in which a pendulum is used to make a metallic sphere collide with the face surface of a golf club having a head and a shaft integrated and fixed together. An accelerometer is attached to the sphere, and parameters indicating the stiffness characteristic are calculated from the detection values of the accelerometer.

International Patent Publication No. WO 2019/030973 discloses a stiffness characteristic measurement device for measuring the stiffness characteristic of a golf club head (collision target object). The device includes a head fixing jig for holding the golf clubhead with the face surface facing upward, a linear bush that lowers a collision rod (colliding object) vertically toward the golf club head, a collision rod with an accelerometer attached thereto, and a computer that calculates a stiffness characteristic (for example, a CT value) of the golf club head based on the detection value of the accelerometer.

In U.S. Pat. No. 6,837,094, it is assumed that the test is performed for a club shape in which the head and the shaft are integrated, and the shaft portion needs to be held to carry out the test. For this reason, when performing measurement for quality control as part of the head manufacturing process, a step of attaching the shaft is required, which complicates the process.

Since the shaft has a columnar shape, the shaft is likely to rotate in the circumferential direction, and it is difficult to set the collision angle with the colliding object to stay constant during the test. In addition, the stiffness characteristic may change due to the influence of the natural vibration of the shaft, which is determined by the material of the shaft, the clamp position, the clamp strength, or the like.

In the collision method using a pendulum as in U.S. Pat. No. 6,837,094, it is difficult to hit stably at the lowest point of the club due to the characteristics of the head shape (difference in FP value, etc.), and this deviation may result in changes in the hitting point position and collision angle, which are difficult to adjust.

In International Patent Publication No. WO 2019/030973, the stiffness characteristic of a golf club head can be easily measured with a certain accuracy. However, there is a problem in that the collision distance may change for each measurement point due to the influence of bulge and roll on the face surface, which lowers the stiffness characteristic measurement accuracy.

SUMMARY

The present technology measures the stiffness characteristic of a collision target object easily and with higher accuracy.

An embodiment of the present technology provides a stiffness characteristic measurement method of holding a collision target object with a measurement target surface facing upward, dropping a colliding object vertically toward the measurement target surface, and calculating stiffness characteristics of the collision target object based on a detection value of an accelerometer attached to the colliding object, the method including: a drop distance changing step of adjusting a drop distance of the colliding object so that a collision velocity of the colliding object at a measurement point is substantially constant each time the measurement point on the measurement target surface is changed.

Another embodiment of the present technology provides a stiffness characteristic measurement device that measures stiffness characteristics of a collision target object, including: a holding mechanism that holds the collision target object with a measurement target surface facing upward; a dropping mechanism that drops a colliding object vertically toward the collision target object; an accelerometer attached to the colliding object; a characteristic calculation unit that calculates stiffness characteristics of the collision target object based on a detection value of the accelerometer; and a drop distance changing unit that adjusts a drop distance of the colliding object so that a collision velocity of the colliding object at a measurement point is substantially constant each time the measurement point on the measurement target surface is changed.

According to the embodiment of the present technology, the drop distance of the colliding object is adjusted so that the collision velocity of the colliding object toward the measurement point is substantially constant each time the measurement point on the measurement target surface is changed. Thus, the collision velocity at each measurement point can be made substantially constant even when the measurement target surface has a curvature, which is advantageous in improving measurement accuracy when the stiffness characteristics have velocity dependence. Further, according to the present technology, since the colliding object is dropped vertically toward the collision target object, it becomes easy to maintain the collision position and the collision angle of the colliding object constant, which is advantageous in improving the measurement accuracy of the stiffness characteristics.

DETAILED DESCRIPTION

Hereinafter, preferred embodiments of a stiffness characteristic measurement device according to the present technology will be described in detail with reference to the accompanying drawings.

The stiffness characteristic measurement device is a device for measuring the stiffness characteristic of a collision target object. In the present embodiment, it is assumed that the collision target object is a golf club head 30, and the CT value of the golf club head 30 is measured as the stiffness characteristic.

First, the golf club head 30 which is the collision target object will be described.

Figure 2:
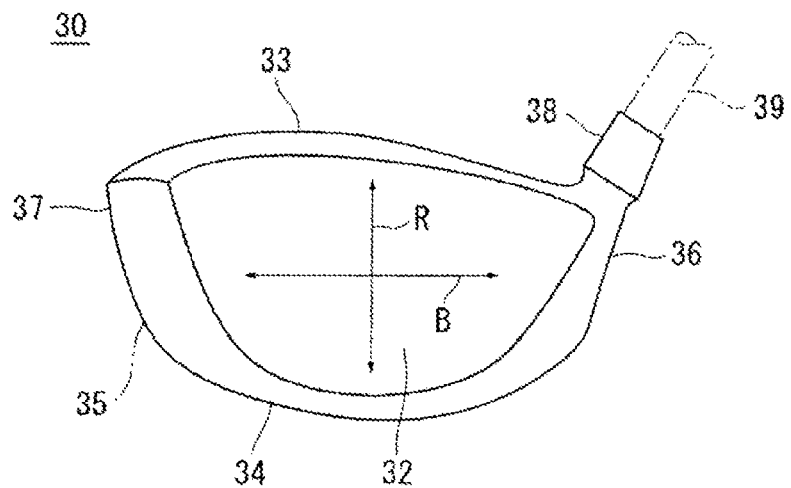
FIG. 2 is a diagram illustrating a configuration of a golf club head 30.

As illustrated in FIG. 2, the golf club head 30 has a hollow structure including a face surface 32, a crown portion 33, a sole portion 34, and a si de portion 35.

The face surface 32 forms a hitting surface for hitting a golf ball.

The crown portion 33 is connected to the face surface 32.

The sole portion 34 is connected to the face surface 32 and the crown portion 33.

The side portion 35 is connected to the crown portion 33 and the sole portion 34 and opposes the face surface 32.

The golf club head 30 is made of metal, for example, and a high-strength low-weight metal such as a titanium alloy or an aluminum alloy is preferably used.

The crown portion 33 is provided with a hosel 38 connected to a shaft 39 on the face surface 32 side and at a position closer to a heel 36.

When the face surface 32 is viewed from the front, a toe 37 is on the side opposite to the heel 36 of the golf club head 30.

In general, the face surface 32 is not a flat surface but a curved surface (a surface having a curvature). More specifically, the bending of the face surface 32 in the up-down direction (longitudinal direction, arrow R) is referred to as "roll", and the bending in the horizontal direction (lateral direction, arrow B) is referred to as "bulge".

The present embodiment will be described based on a wood-based golf club head having a hollow structure as illustrated in FIG. 2, but the present embodiment is not limited to this. For example, the present technology can be also applied to an iron-based golf club head having a hollow or solid structure and a utility golf clubhead.

Figure 1:
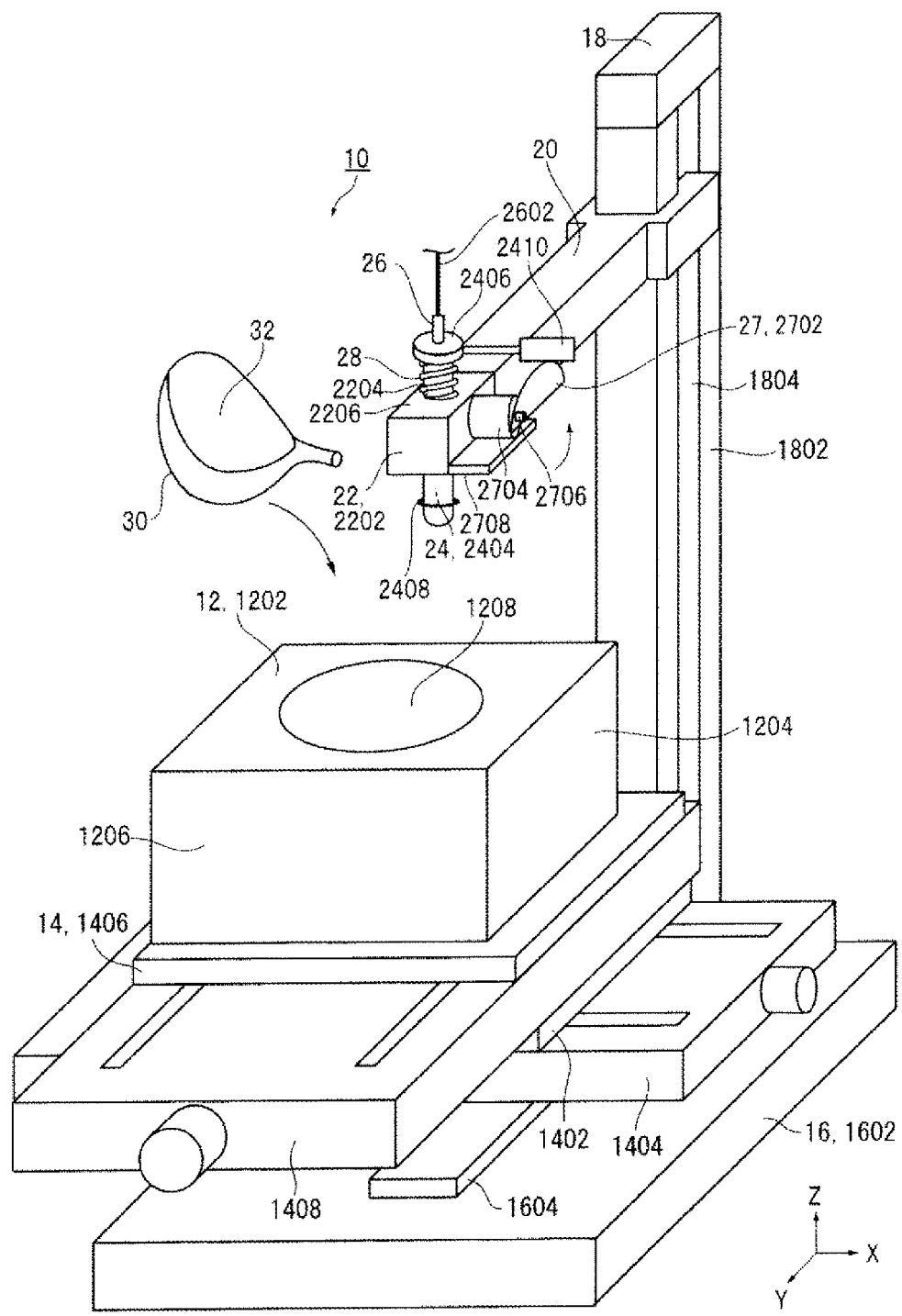
FIG. 1 is an explanatory diagram illustrating a configuration of a stiffness characteristic measurement device 10 according to an embodiment.

FIG. 1 is an explanatory diagram illustrating the configuration of a stiffness characteristic measurement device 10 according to an embodiment.

The stiffness characteristic measurement device 10 holds the golf club head 30 (collision target object) with the face surface 32 (measurement target surface) facing upward, and drops a collision rod 24 (colliding object) vertically onto the face surface 32, and calculates the stiffness characteristic of the golf club head 30 based on a detection value of an accelerometer 26 attached to the collision rod 24.

Figure 6:
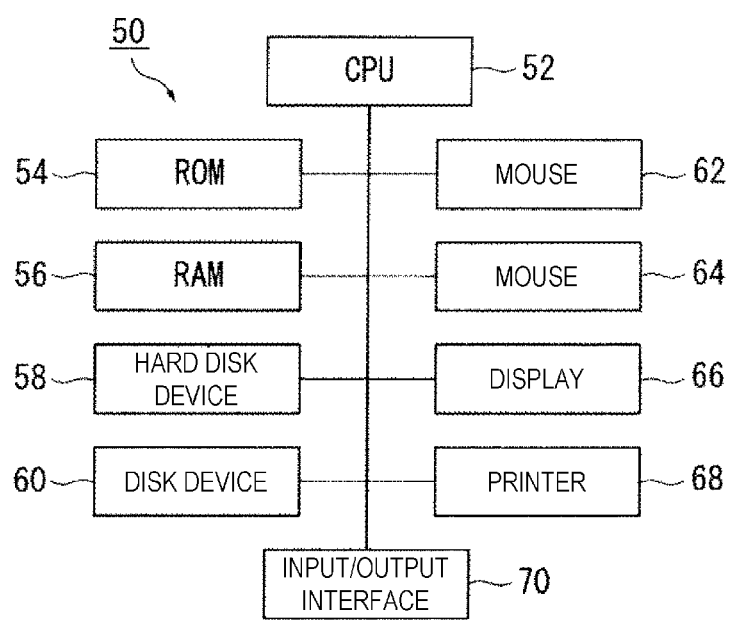
FIG. 6 is a block diagram illustrating a configuration of a computer 50.

More specifically, the stiffness characteristic measurement device 10 includes a head fixing jig 12, an XY stage 14, a Z stage 18, an arm 20, a linear bush 22, a collision rod 24, an accelerometer 26, and a computer 50 (see FIG. 6).

The head fixing jig 12 functions as a holding mechanism for holding a collision target object with the measurement target surface facing the upper surface. In the present embodiment, the head fixing jig 12 has a rectangular parallelepiped shape, and has an upper surface 1202 facing the collision rod 24 arranged at an upper portion of the head fixing jig 12, a lower surface (not illustrated) in contact with the XY stage 14, side surfaces 1204 facing each other in the drawing sheet left-right direction (X direction), and side surfaces 1206 facing each other in the drawing sheet depth direction (Y direction).

Figure 3:
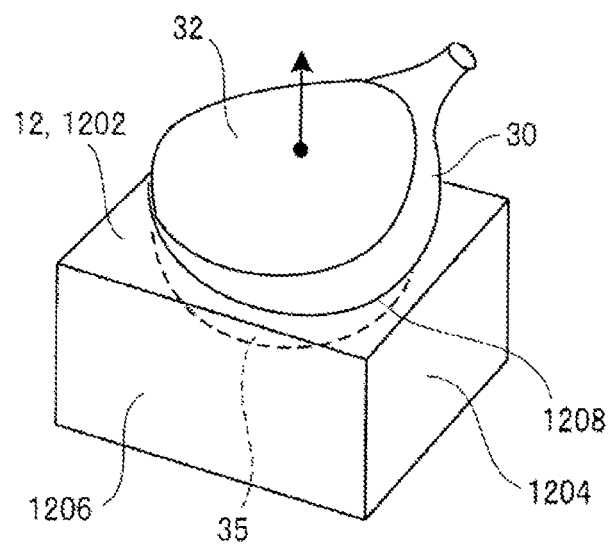
FIG. 3 is a diagram illustrating a state in which the golf club head 30 is set on a head fixing jig 12.

A fitting hole 1208 into which the golf club head 30 is fitted is formed in the upper surface 1202. The fitting hole 1208 is formed in the same shape as the side portion 35 side of the golf club head 30, and as illustrated in FIG. 3, the golf club head 30 can be fitted with the face surface 32 (measurement target surface) facing upward. The golf club head 30 fitted in the fitting hole 1208 is held by the head fixing jig 12 with the face surface 32 facing the upper surface. At this time, the shape of the fitting hole 1208 is formed so that the face surface 32 is substantially horizontal (so that the normal line at the center of the face is in the vertical direction).

In the golf club head 30 fitted in the fitting hole 1208, the side portion 35 is in contact with the head fixing jig 12 (the fitting hole 1208), but the crown portion 33 and the sole portion 34 are not in contact with the head fixing jig 12. This is to prevent the face surface 32 from deflecting due to the head fixing jig 12 coming into contact with the crown portion 33 and the sole portion 34 that are in direct contact with the face surface 32.

When measuring a golf club head 30 having a different model number (shape), the head fixing jig 12 is replaced with a head fixing jig 12 formed according to the shape of the golf club head 30.

The head fixing jig 12 is made of a vibration damping material such as silicon. This is to attenuate the vibration of the golf club head 30 that occurs when the collision rod 24 to be described later collides with the face surface 32, and to reduce the measurement noise of the accelerometer 26. That is, the head fixing jig 12 which is a holding mechanism is formed to include a vibration damping material that attenuates the vibration of the golf club head 30, which is a collision target object.

The XY stage 14 includes an X-axis table 1402, an X-axis stage 1404, a Y-axis table 1406, and a Y-axis stage 1408.

The head fixing jig 12 is placed on the Y-axis table 1406. The Y-axis stage 1408 is placed on the X-axis table 1402.

A moving mechanism such as an actuator is built into the X-axis stage 1404 so that the X-axis table 1402 can be moved on the X-axis stage 1404.

Similarly, a moving mechanism such as an actuator is built into the Y-axis stage 1408 so that the Y-axis table 1406 can be moved on the Y-axis stage 1404.

In the present embodiment, the computer 50 (see FIG. 6) is connected to the XY stage 14, and the moving mechanism is automatically controlled whereby the head fixing jig 12 automatically moves at a predetermined timing.

The mechanism of the XY stage 14 is not limited to the above, and various conventionally known mechanisms can be adopted.

In the present embodiment, the head fixing jig 12 (holding mechanism) can be moved in the horizontal direction (XY direction) by the XY stage 14, so that the drop position of the collision rod 24 (colliding object) on the face surface 32 (measurement target surface) of the golf club head 30 (collision target object) can be adjusted.

The linear bush 22 (dropping mechanism) to be described later may be movable in the horizontal direction (XY direction), so that the drop position of the collision rod 24 (colliding object) on the face surface 32 (measurement target surface) of the golf club head 30 (collision target object) can be adjusted.

A pedestal 16 includes a bottom plate portion 1602 and a rail 1604.

The bottom plate portion 1602 is arranged on a stable horizontal surface such as a workbench.

The rail 1604 is arranged on the bottom plate portion 1602 along the Y-axis direction, and the X-axis stage 1404 of the XY stage 14 is arranged on the rail 1604. The X-axis stage 1404 can move on the rail 1604 in the drawing sheet depth direction (Y-axis direction).

A magnet (position fixing mechanism) (not illustrated) is attached to the end of the rail 1604 on the back side of the drawing sheet (Z stage 18 side). In the present embodiment, the X-axis stage 1404 of the XY stage 14 is made of a metal such as stainless steel. When the X-axis stage 1404 moves to the end (measurement position) of the rail 1604 on the back side of the drawing sheet, the X-axis stage 1404 is attracted to the magnet, and the position of the XY stage 14 is fixed.

By adopting the pedestal 16 using such a rail 1604, when the golf club head 30 is set on the head fixing jig 12, the head fixing jig 12 can be moved to a position where the golf club head 30 does not interfere with the linear bush 22 (described later) in the up-down direction.

Instead of using such a head setting mechanism using the rail 1604, the stroke in the Y-axis direction of the XY stage 14 (the stroke of the Y-axis stage 1408) may be increased. In particular, in the case of an automatically-controlled XY stage 14 as in this case, when the head supply position at the time of setting the golf club head 30 on the head fixing jig 12 and the subsequent measurement position are set in advance on the program, the respective positions can be instantaneously and accurately reproduced by operating the computer 50.

The Z stage 18 moves the arm 20 in the height direction (Z-axis direction), and includes a support column 1802 and a moving mechanism (not illustrated).

The support column 1802 is erected in the vertical direction (Z-axis direction) upward from the end of the bottom plate portion 1602.

The moving mechanism includes an actuator or the like, and moves the arm 20 in the height direction along the groove 1804 provided in the support column 1802.

In the present embodiment, the computer 50 (see FIG. 6) is connected to the Z stage 18, and the moving mechanism is automatically controlled, so that the arm 20 automatically moves at a predetermined timing.

The mechanism of the Z stage 18 is not limited to the above, and various conventionally known mechanisms can be adopted.

The arm 20 extends in the horizontal direction (Y-axis direction) from the support column 1802 toward the front surface of the device (the side on which the XY stage 14 and the like are arranged).

Since the arm 20 can be moved in the vertical direction by the Z stage 18, the linear bush 22 connected to the arm 20 can also be moved in the up-down direction, and the distance along the up-down direction (vertical direction) between the drop start position of the collision rod 24 (colliding object) described later and the face surface 32 (collision target surface) of the golf club head 30 (collision target object) can be adjusted. That is, the Z stage 18 functions as a drop distance adjustment mechanism.

The reason why the distance along the up-down direction between the drop start position of the collision rod 24 and the face surface 32 can be adjusted in this way is that the collision velocity of the collision rod 24 with respect to the face surface 32 changes depending on this distance. It is known that the CT value measured in the present embodiment has velocity dependence. Therefore, it is necessary to determine the collision velocity of the collision rod 24 with respect to the face surface 32 in advance and perform measurement at the collision velocity. By providing the drop distance adjustment mechanism, the collision velocity of the collision rod 24 with respect to the face surface 32 can be arbitrarily adjusted.

The linear bush 22 is attached to the tip of the arm 20 and functions as a dropping mechanism for dropping the collision rod 24 (colliding object) described later onto the golf clubhead 30 (collision target object) in the vertical direction (longitudinal direction of the columnar collision rod 24).

The linear bush 22 includes a main body 2202 and an insertion hole 2204. The insertion hole 2204 penetrates from an upper surface 2206 of the main body 2202 to a lower surface 2208 (see FIGS. 5A-5D). A steel ball constituting a bearing mechanism is arranged on the inner peripheral surface of the insertion hole 2204 in the main body 2202 so as to guide the collision rod 24 inserted in the insertion hole 2204 downward in the vertical direction.

By using the linear bush 22, the drop direction of the collision rod 24 can be regulated, and the drop position with respect to the golf club head 30 can be adjusted with high accuracy.

As the linear bush 22, a type using a simple cylindrical sliding body may be used.

Figure 4:
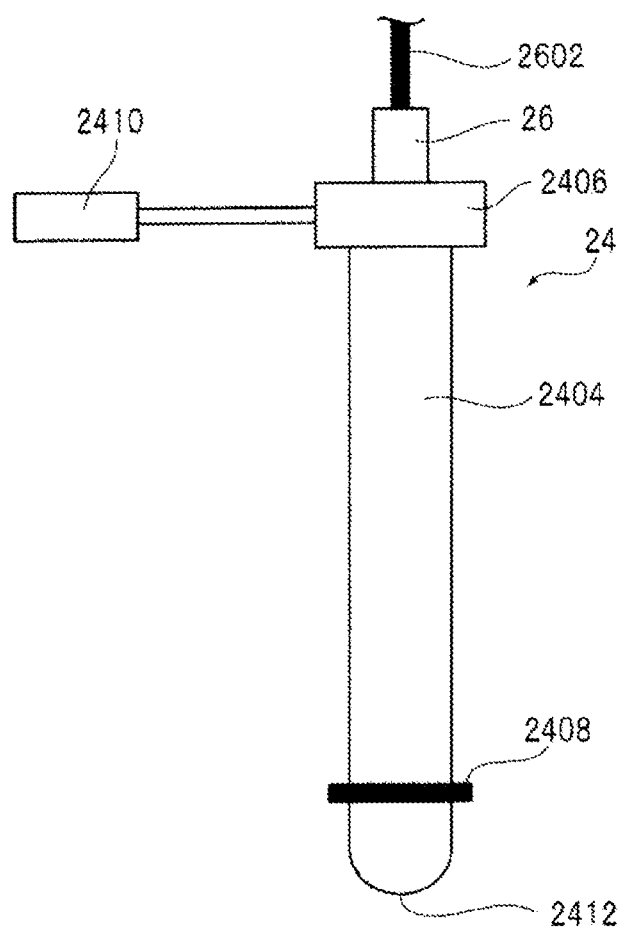
FIG. 4 is a diagram illustrating a configuration of a collision rod 24.

As illustrated in FIG. 4, the collision rod 24 (colliding object) includes a rod body 2404, an upper stopper 2406, a lower stopper 2408, and a lever 2410.

The rod body 2404 is a columnar rod-like member, and is made of a metal such as stainless steel. The rod body 2404 may have a pillar shape other than a columnar shape (for example, a prismatic shape). One bottom surface 2412 of the rod body 2404 (the bottom surface on the side that collides with the golf club head 30 (collision target object) in the use state) is formed in a spherical shape. The diameter of the rod body 2404 has such a dimension that the rod body 2402 can drop from the insertion hole 2204 of the linear bush 22.

The upper stopper 2406 is attached to the upper end (the end on a side opposite to the bottom surface 2412) of the rod body 2404. Since the upper stopper 2406 has an outer diameter larger than the inner diameter of the insertion hole 2204 of the linear bush 22, the upper stopper 2406 cannot move into the insertion hole 2204 of the linear bush 22. Therefore, when the collision rod 24 is dropped, the collision rod 24 cannot move below the position where the upper stopper 2406 abuts on the upper surface 2206 of the linear bush 22. That is, the upper stopper 2406 regulates the lowest point position of the collision rod 24 located in the insertion hole 2204 of the linear bush 22.

Figure 5:
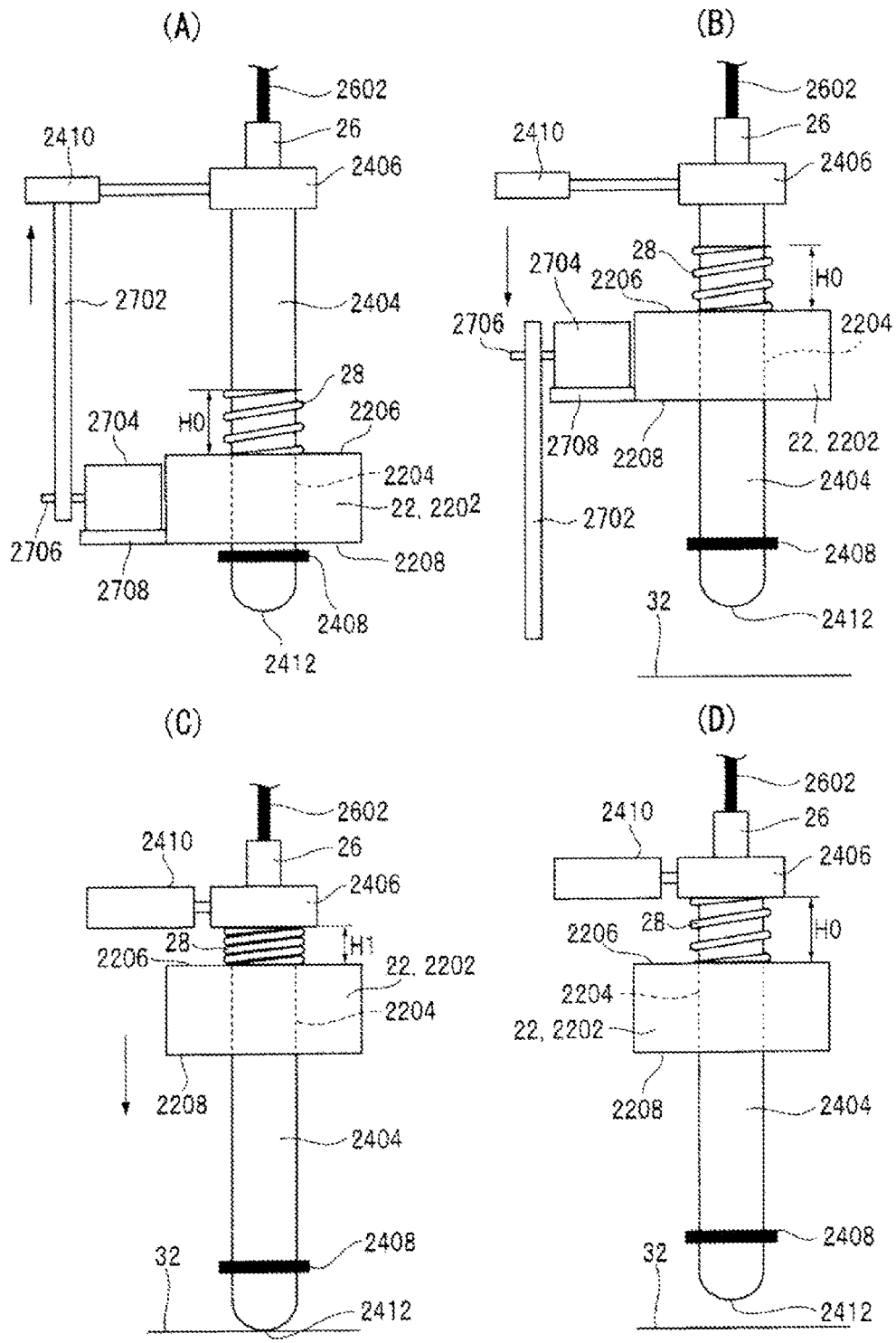
FIGS. 5A-5D are explanatory diagrams illustrating the behavior of the collision rod 24 at the time of collision.

In actual use, as illustrated in FIGS. 1 and 5, a spring 28 is sandwiched between the upper stopper 2406 and the upper surface 2206 of the linear bush 22, so that the upper stopper 2406 and the upper surface 2206 do not come into direct contact with each other. The spring 28 is, for example, a compression coil spring, and the rod body 2404 of the collision rod 24 is inserted through the inner diameter side of the spring 28.

Although details will be described later, the spring 28 functions as a re-collision prevention mechanism that holds the collision rod 24 (colliding object) above the face surface 32 (measurement target surface) after the collision rod 24 collides with the face surface 32, and prevents the collision rod 24 from re-colliding with the face surface 32.

The lower stopper 2408 is attached near the bottom surface 2412 of the rod body 2404.

The lower stopper 2408 is made of a flexible member (for example, rubber).

Since the lower stopper 2408 also has an outer diameter larger than the inner diameter of the insertion hole 2204 of the linear bush 22, the lower stopper 2408 cannot move into the insertion hole 2204 of the linear bush 22. Therefore, when the collision rod 24 is moved upward, the collision rod 24 cannot move above the position where the lower stopper 2408 is in contact with the lower surface 2208 of the linear bush 22. That is, the lower stopper 2408 regulates the highest point position of the collision rod 24 located in the insertion hole 2204.

In the present embodiment, the collision rod 24 is moved upward by a cam mechanism 27 described later, and the amount of movement at that time is set to a range in which the lower stopper 2408 does not come into contact with the lower surface 2208 of the linear bush 22 as illustrated in FIG. 5A (a range in which the collision rod 24 does not reach the highest point position).

The lower stopper 2408 is removable from the rod body 2404. When removing the collision rod 24 from the linear bush 22, the lower stopper 2408 is removed from the rod body 2404, and then the rod body 2404 is moved upward and pulled out from the insertion hole 2204. When the collision rod 24 is attached to the linear bush 22, the rod body 2404 with the lower stopper 2408 removed is inserted into the insertion hole 2204 and moved downward to a position regulated by the spring 28. Subsequently, the lower stopper 2408 is attached to the rod body 2404.

That is, as described above, the linear bush 22 (dropping mechanism) holds the collision rod 24 (colliding object) so as to be movable in the vertical direction, and the upper stopper 2406 and the lower stopper 2408 function as stopper mechanisms that regulate the highest point position and the lowest point position of the collision rod 24 in the state of being inserted (held) in the linear bush 22.

The lever 2410 is a rod-like member attached to the upper stopper 2406, and is used when the position of the collision rod 24 is moved upward by the cam mechanism 27.

The cam mechanism 27 includes a cam 2702, a motor 2704, and a shaft 2706. A stay 2708 extending in the horizontal direction (X-axis direction) is attached to the side surface of the linear bush 22 (the side on which the lever 2410 extends), and the motor 2704 is mounted on the stay 2708. The shaft 2706 is rotated by the driving of the motor 2704, and the cam 2702 rotates about the shaft 2706 in the YZ plane. When the cam 2702 is positioned upward due to the rotation of the shaft 2706, the lever 2410 is pushed up and the entire collision rod 24 moves upward.

Figure 13:
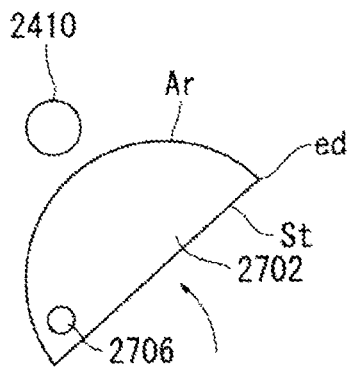
FIGS. 13A-13C are explanatory diagrams schematically illustrating the movements of a cam 2702 and a lever 2410.
Figure 13:
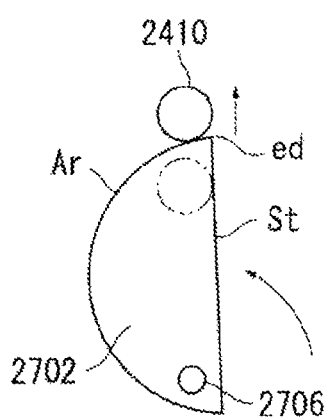
Figure 13:
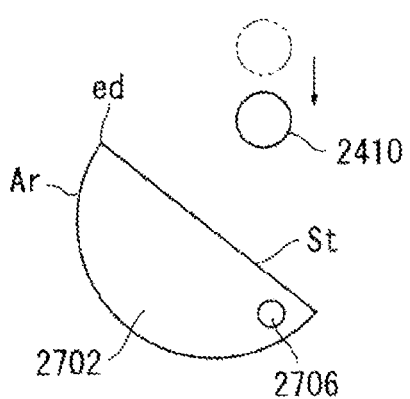

The movements of the cam 2702 and the lever 2410 are illustrated in more detail in FIGS. 13A-13C. In FIGS. 13A-13C, from the viewpoint of visibility, configurations other than those of the cam 2702 and the lever 2410 are not illustrated.

In the present embodiment, the cam 2702 has a substantially semicircular shape, and its side surface has an arc portion Ar and a straight portion St. The cam 2702 rotates counterclockwise about the shaft 2706 so that the arc portion Ar side is in contact with the lever 2410. The shaft 2706 is located directly below the lever 2410.

As illustrated in FIG. 13A, when the cam 2702 and the lever 2410 are separated from each other, the collision rod 24 is in the normal position (the upper stopper 2406 is located on the spring 28 contracted by the weight of the collision rod 24).

As illustrated in FIG. 13B, when the arc portion Ar of the cam 2702 and the lever 2410 come into contact with each other, the collision rod 24 is pushed upward from the normal position (indicated by the dotted line in FIG. 13B).

As illustrated in FIG. 13C, when an ended of the arc portion Ar of the cam 2702 separates from the lever 2410, the collision rod 24 freely drops downward from the state of being pushed upward (indicated by the dotted line in FIG. 13C).

With such a mechanism, the vertical movement of the collision rod 24 can be automatically executed.

The mechanism for moving the collision rod 24 up and down is not limited to the cam mechanism as described above, and various conventionally known mechanisms can be adopted.

As for the size of the collision rod 24, for example, the diameter of the rod body 2404 is preferably 12 mm or more and 20 mm or less, the length (length from the boundary between the upper stopper 2406 and the accelerometer 26 to the bottom surface 2412) is preferably 60 mm or more and 120 mm or less, the mass (including the rod body 2404, the upper stopper 2406, the lower stopper 2408, and the lever 2410) is preferably 100 g or more and 200 g or less, and the radius of curvature of the bottom surface 2412 is preferably 30 mm or less, more preferably 20 mm or more and 30 mm or less.

This is because the size of the colliding object specified in the procedure of the pendulum test (see "Technical Description of the Pendulum Test (Revised Version)", The Royal and Ancient Golf Club of St Andrews and United States Golf Association, November, 2003) falls within the above-mentioned ranges.

Returning to the description of FIG. 1, the accelerometer 26 is attached to the surface of the collision rod 24 (colliding object) opposite to the bottom surface 2412 and measures the acceleration of the collision rod 24 occurring when the collision rod 24 and the face surface 32 (collision target object) collide with each other.

The accelerometer 26 is connected to the computer 50 via a digital oscilloscope by a wiring line 2602, and outputs the detection value to the computer 50. The digital oscilloscope converts the analog signal output from the accelerometer into a digital value. The accelerometer 26 and the computer 50 may be connected by wireless communication.

FIG. 6 is a block diagram illustrating the configuration of the computer 50.

The computer 50 includes a CPU (central processing unit) 52, a ROM (read only memory) 54, a RAM (random access memory) 56, a hard disk device 58, a disk device 60, a keyboard 62, a mouse 64, a display 66, a printer 68, and an input/output interface 70, and these components are connected via an interface circuit and a bus line (not illustrated).

The ROM 54 stores a control program and the like, and the RAM 56 provides a working area.

The hard disk device 58 stores a stiffness characteristic calculation program for calculating the stiffness characteristic (CT value in the present embodiment) of the golf club head 30 (collision target object) based on the detection value of the accelerometer 26.

The disk device 60 records and/or plays data on a recording medium such as a CD (compact disc) or DVD (digital video disc).

The keyboard 62 and the mouse 64 receive operation input by the operator.

The display 66 displays and outputs data, the printer 68 prints out the data, and the display 66 and the printer 68 output the data.

The input/output interface 70 exchanges data with an external device such as the accelerometer 26.

Figure 14:
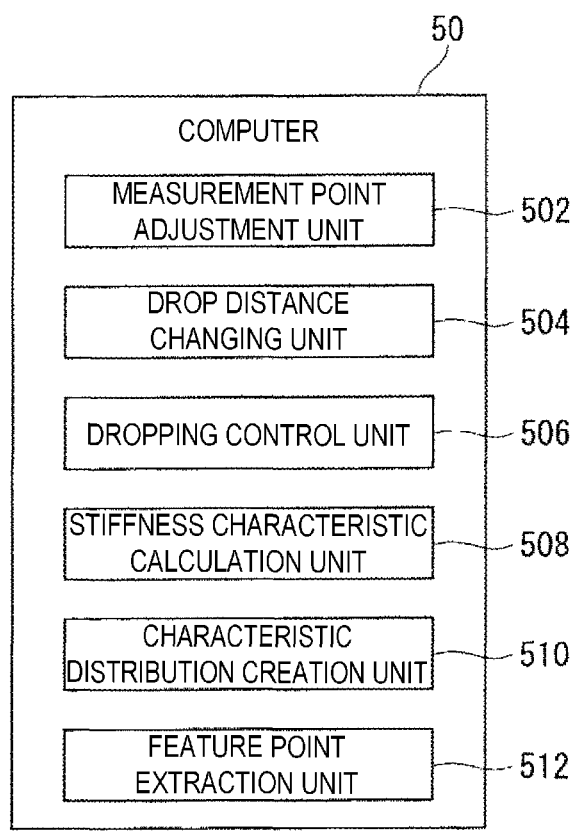
FIG. 14 is a block diagram illustrating a functional configuration of a computer 50.

FIG. 14 is a block diagram illustrating a functional configuration of the computer 50.

By executing the control program, the CPU 52 functions as a measurement point adjustment unit 502, a drop distance changing unit 504, a drop control unit 506, a stiffness characteristic calculation unit 508, a characteristic distribution creation unit 510, and a feature point extraction unit 512.

The measurement point adjustment unit 502 changes the measurement point on the face surface 32 (measurement target surface) by changing the relative position between the collision rod 24 (colliding object) and the golf club head 30 (collision target object).

In the present embodiment, the measurement point adjustment unit 502 outputs a control signal instructing the XY stage 14 to move the X-axis table 1402 and the Y-axis table 1406, so that the position of the golf club head 30 with respect to the collision rod 24 is changed and the measurement point on the face surface 32 is changed.

Figure 12:
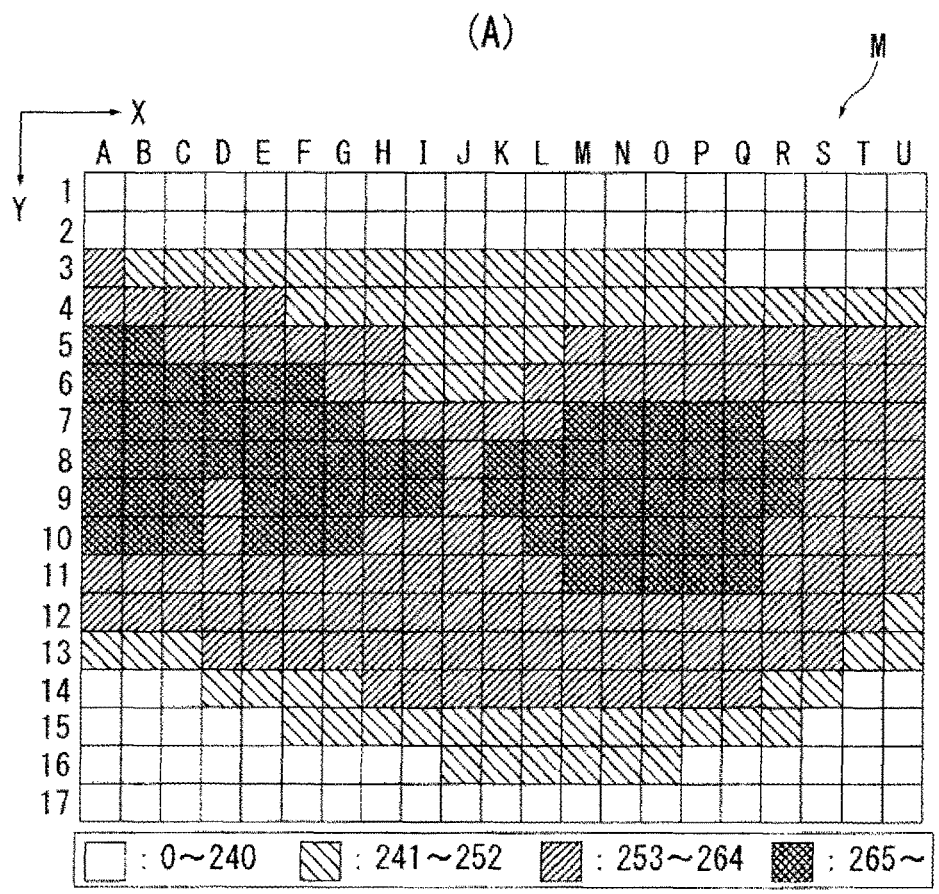
FIGS. 12A-12B provide an explanatory diagram schematically illustrating a measurement point on the golf club head 30.
Figure 12:
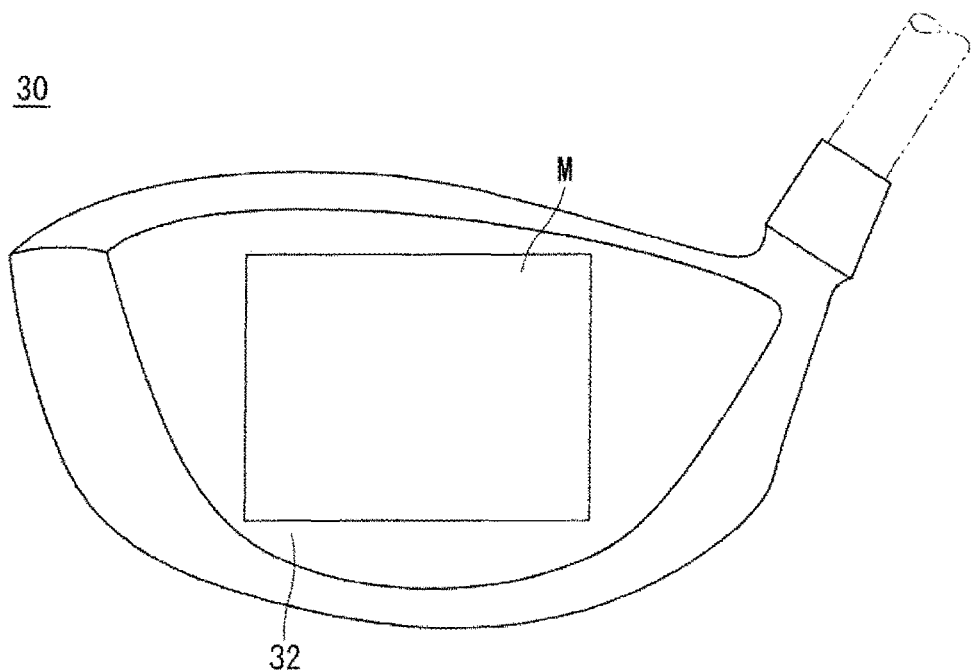

FIGS. 12A-12B provide an explanatory diagram schematically illustrating the measurement points on the golf club head 30.

As illustrated in FIG. 12B, in the present embodiment, a measurement range M having a predetermined width is set on the face surface 32 of the golf club head 30. As illustrated in FIG. 12A, the measurement range M is divided into a plurality of small regions, and the center position of each small region is set as the measurement point. In the example of FIGS. 12A-12B, the size of the small region is set to 2.5 mm square, and 17×21=357 measurement points are set.

The measurement range M is preferably set so that the up-down (crown-sole) direction and the left-right (toe-heel) direction are symmetrical with respect to, for example, the center of the face surface 32. In the example of FIGS. 12A-12B, the measurement range M and the measurement points are set by aligning the center of a measurement point "9K" with the center of the face surface 32.

In addition, some patterns of set values (size and position of the small region) of a measurement point may be prepared in advance and saved as a file in the hard disk device 58 or the like of the computer 50, and the measurement range M and the measurement point may be changed by appropriately calling out the set values according to a measurement target golf club (driver, fairway, etc.).

At the time of measurement, the measurement point adjustment unit 502 first controls the position of the XY stage 14 so that, for example, a measurement point 1A is directly below the collision rod 24. When the measurement at the measurement point 1A is complete, the measurement point adjustment unit 502 controls the position of the X-axis table 1402 so that a measurement point 1B is directly below the collision rod 24. Similarly, when all the measurement points in the first row are measured (up to 1U), the measurement point adjustment unit 502 controls the position of the Y-axis table 1406 so that a measurement point 2U is directly below the collision rod 24. Similarly, by repeating the movements in the X-axis direction and the Y-axis direction, measurement is performed at 357 measurement points.

That is, in the present embodiment, the measurement point adjustment unit 502 changes the relative position between the collision rod 24 (colliding object) and the golf club head 30 (collision target object) by predetermined distances along two orthogonal axes (X-axis and Y-axis) in the horizontal plane.

Returning to the description of FIG. 14, the drop distance changing unit 504 adjusts the drop distance of the collision rod 24 (colliding object) so that the collision velocity of the collision rod (colliding object) with the measurement point is substantially constant each time the measurement point on the face surface 32 (measurement target surface) is changed.

As described above, it is known that the CT value measured in the present embodiment has velocity dependence. Therefore, the collision velocity of the collision rod 24 is preferably constant at all the measurement points. On the other hand, when the face surface 32 of the golf club head 30 is not a flat surface and the position of the arm 20 with respect to the head fixing jig 12 is fixed, for example, the collision velocity may differ between the measurement point located at the center of the face surface 32 and the measurement point located at the end of the face surface 32. Therefore, the drop distance changing unit 504 controls the Z stage 18 to change the position (height) of the arm 20 for each measurement point to change the drop start height of the collision rod 24.

For the determination of the drop distance by the drop distance changing unit 504, for example, any of the following methods can be used.

Method 1

The collision rod 24 is actually made to collide with the face surface 32 at each measurement point to measure the acceleration, and the collision velocity is calculated by integrating the acceleration to change the position of the arm 20.

For example, when the collision velocity is faster than a predetermined collision velocity at the time of measurement (when wanting to decrease the collision velocity), the position of the arm 20 is raised to increase the drop distance. When the collision velocity is slower (when wanting to increase the collision velocity), the position of the arm 20 is lowered to decrease the drop distance.

Due to various factors, the collision velocity of the collision rod 24 is considered to be slightly different for each measurement even if the drop distance is the same. Therefore, when the collision velocity at the time of actual measurement is in the range of, for example, ±0.05 m/s with respect to the collision velocity at the time of measurement, it is realistic to regard this as an error within the allowable range.

In general, it is conceivable that, when wishing to decrease the collision velocity, the position of the arm 20 is lowered to decrease the drop distance, whereas when wishing to increase the collision velocity, the position of the arm 20 is raised to increase the drop distance. However, in the stiffness characteristic measurement device 10 used in the present embodiment, as will be described later (see FIGS. 5A-5D), the collision rod 24 collides with the face surface 32 while compressing the spring 28. When the position of the arm 20 is raised to increase the distance between the drop start point of the collision rod 24 and the face surface 32, the spring 28 is greatly compressed at the time of collision, and the collision velocity of the collision rod 24 becomes slower than before the position of the arm 20 is changed. If the position of the arm 20 is raised too much, the collision rod 24 and the face surface 32 will not come into contact with each other.

When the position of the arm 20 is lowered to shorten the distance between the drop start position of the collision rod 24 and the face surface 32, the collision rod 24 and the face surface 32 collide with each other in a state where the amount of compression of the spring 28 is small (before deceleration), and the collision velocity of the collision rod 24 becomes faster than before the position of the arm 20 is changed. If the position of the arm 20 is lowered too much, the collision rod 24 and the face surface 32 come into contact with each other even when no load is applied.

Therefore, the drop distance changing unit 504 adjusts the position of the arm 20 within a range in which the collision rod 24 and the face surface 32 are in contact with each other when a load is applied and the collision rod 24 and the face surface 32 are not in contact with each other when no load is applied.

That is, in Method 1, the drop distance changing unit 504 integrates the acceleration signal obtained by the accelerometer 26 to calculate the collision velocity, and adjusts the drop distance of the collision rod 24 (colliding object) so that the collision velocity is in a predetermined range.

Method 2

A distance sensor measures the separation distance (drop distance) between the tip of the collision rod 24 and a measurement point to change the position of the arm 20.

In this case, for example, a distance sensor such as an optical distance sensor is installed at the tip of the collision rod 24 or on the lower surface 2208 (see FIGS. 5A-5D) of the main body 2202 of the linear bush 22. When the distance sensor is installed at the tip of the collision rod 24, the distance measured by the distance sensor when the collision rod 24 is at a normal position becomes the drop distance without change. When the distance sensor is installed on the lower surface 2208 of the linear bush 22, a difference between the distance measured by the distance sensor and the distance from the lower surface 2208 of the linear bush 22 to the tip of the collision rod 24 at the normal position is the drop distance. However, since the distance from the lower surface 2208 of the linear bush 22 to the tip of the collision rod 24 at the normal position is constant, the difference in the measurement value from the sensor becomes the difference in the drop distance without change.

The drop distance changing unit 504 controls the Z stage 18 so that the measurement value from the distance sensor is a predetermined separation distance.

That is, in Method 2, the drop distance changing unit 504 measures the separation distance between the collision rod 24 (colliding object) and the measurement point before dropping, and adjusts the drop distance of the collision rod 24 (colliding object) so that the separation distance is constant.

The drop control unit 506 controls the drop state of the collision rod 24 with respect to the golf club head 30. More specifically, the drop control unit 506 controls the driving state (rotational velocity and position of the cam 2702) of the motor 2704 of the cam mechanism 27, and drops the collision rod 24 toward the golf club head 30 at a predetermined timing. The predetermined timing is, for example, the timing at which the position adjustment of the XY stage 14 by the measurement point adjustment unit 502 and the change of the drop distance by the drop distance changing unit 504 (when Method 2 described above is adopted) are complete.

The stiffness characteristic calculation unit 508 drops the collision rod 24 (colliding object) on the measurement point, and calculates the stiffness characteristic at each measurement point based on the detection value of the accelerometer 26 at the time of the drop. In the present embodiment, the stiffness characteristic is the CT value of the golf club head 30 (more specifically, at each measurement point of the face surface 32).

The acceleration detected by the accelerometer 26 is time-series acceleration data detected at predetermined sampling intervals. The stiffness characteristic calculation unit 508 filters the acceleration data, removes noise, integrates the data, and converts the acceleration data into time-series data of a velocity V.

Figure 8:
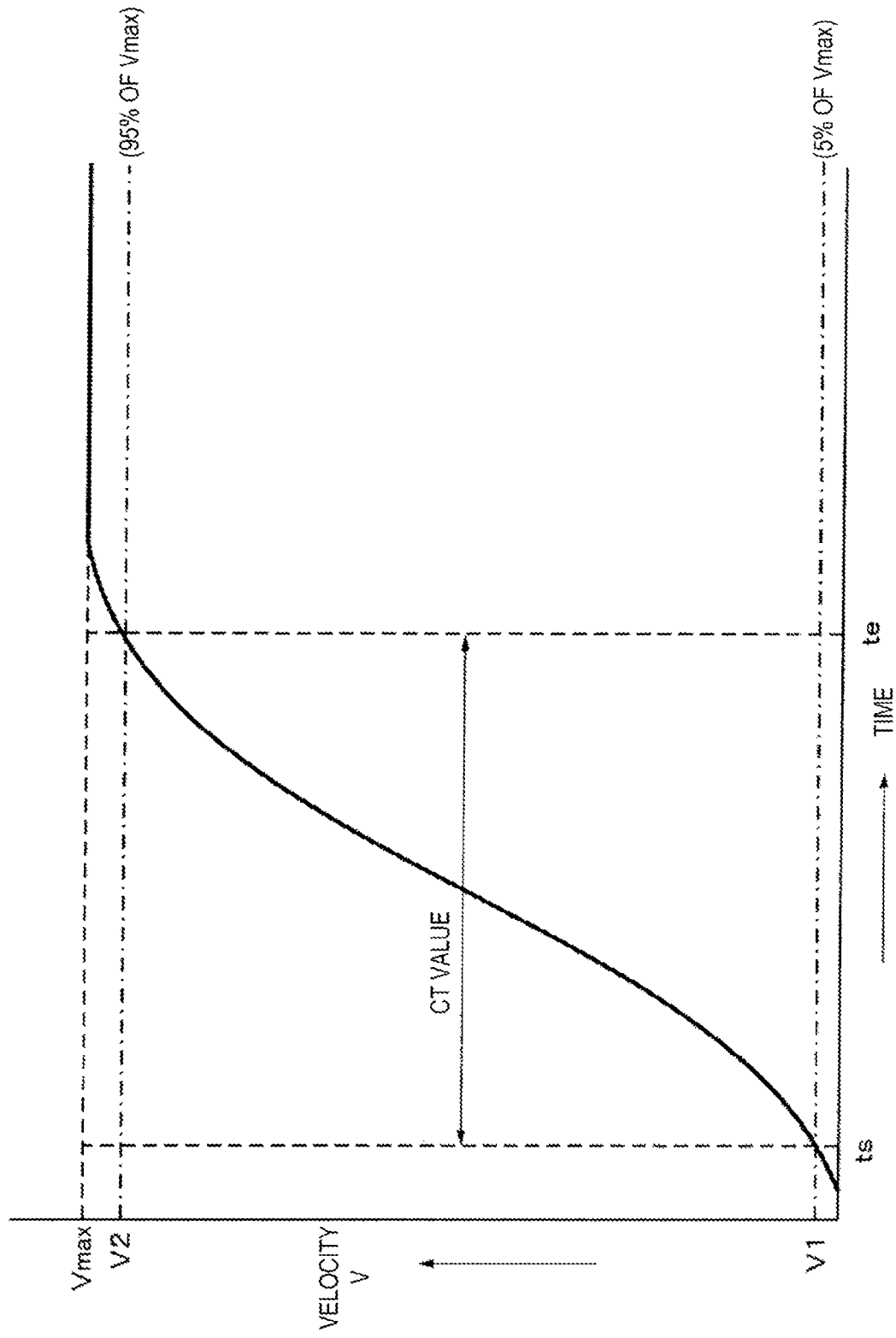
FIG. 8 is a graph showing time-series data of the velocity V of the collision rod 24.

FIG. 8 is a graph showing time-series data of the velocity V of the collision rod 24.

The stiffness characteristic calculation unit 508 calculates a CT value indicating the stiffness characteristic of the golf club head 30 as follows.

Vmax is defined as the maximum velocity in the time series data of the velocity V.

The time at which the velocity V reaches V1 (V1=α% of Vmax) is defined as a start time ts.

The time at which the velocity V reaches V2 (V2=β% of Vmax) is defined as an end time te.

α is 0% to 99%, β is 1% to 100%, and α<β.

The CT value is obtained by te−ts.

Generally, α%=5% and β%=95%.

As described above, the CT value has velocity dependence. Therefore, the CT value may be measured at a plurality of collision velocities, and a representative CT value of the golf club head 30 may be calculated from the relationship between the collision velocity and the CT value.

Figure 9:
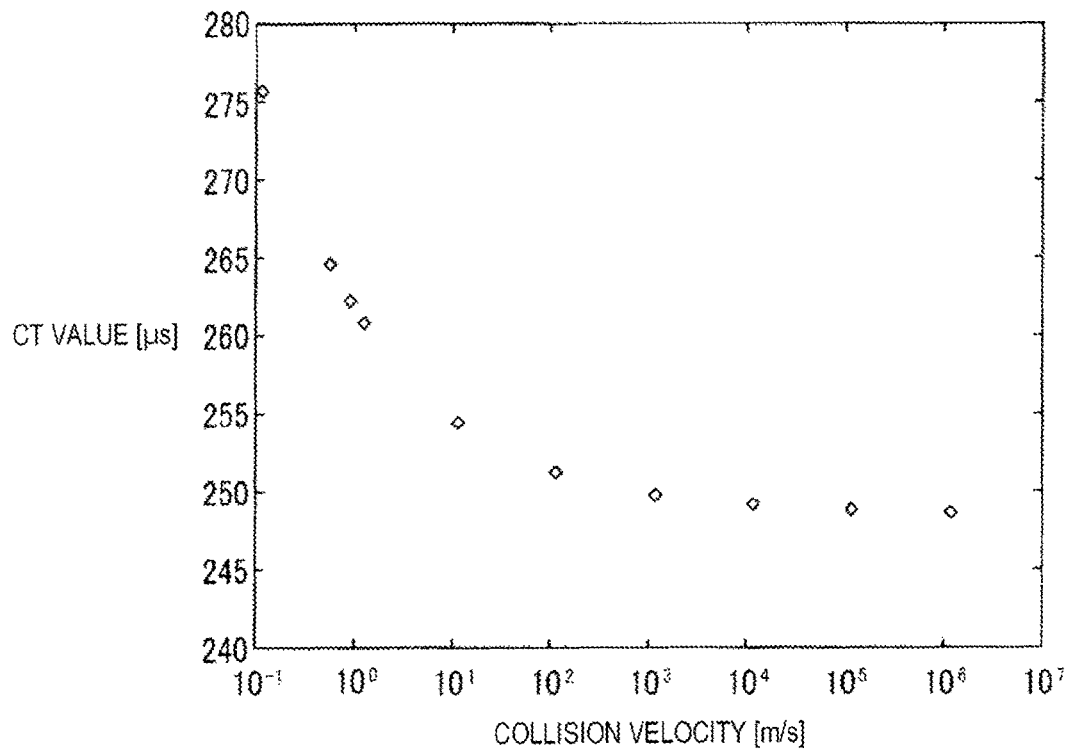
FIG. 9 is a graph showing an example of CT values measured a plurality of times while changing the collision velocity.

FIG. 9 is a graph showing an example of CT values measured a plurality of times for the same golf club head 30 while changing the collision velocity (changing the position of the arm 20).

In FIG. 9, the horizontal axis is the collision velocity [m/s] and the vertical axis is the CT value [µs].

As shown in the graph of FIG. 9, the CT value increases as the collision velocity decreases, and decreases as the collision velocity increases.

Figure 10:
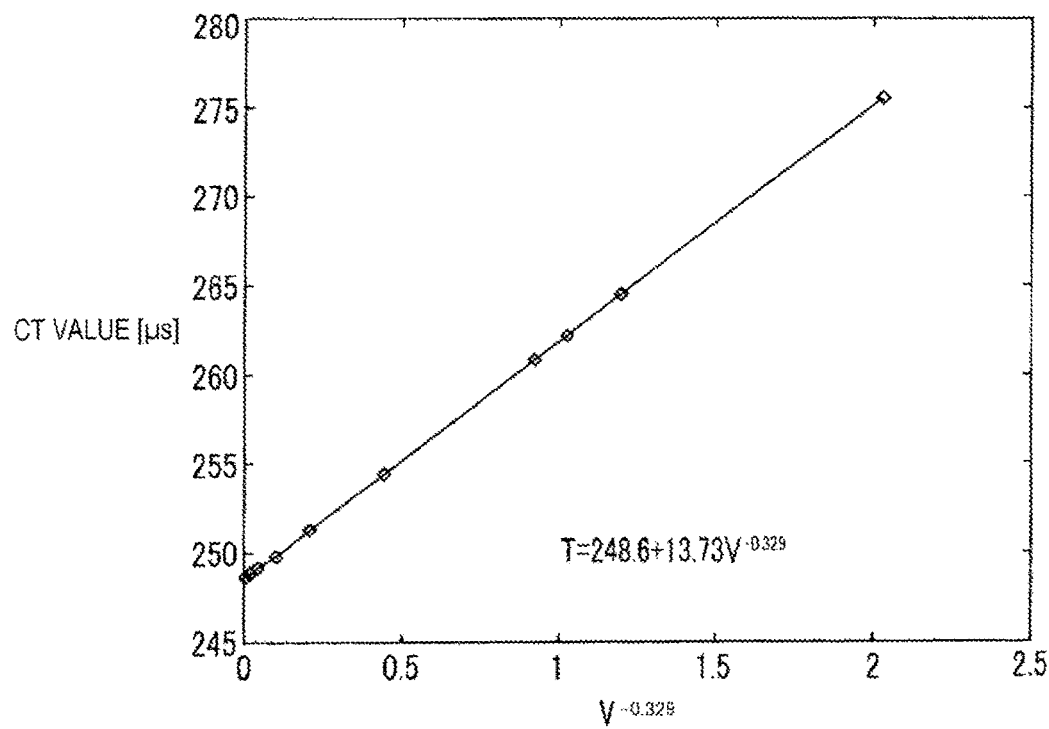
FIG. 10 is a graph converted from FIG. 9.

FIG. 10 is a graph obtained by converting the horizontal axis of FIG. 9 into a value raised to the power of −0.329 ($V^{-0.329}$).

When such a conversion is performed, the CT values are aligned on a straight line. The intersection (y-intercept) of this straight line and the Y-axis is taken as the representative CT value of the golf club head 30. In the example of FIG. 10, the CT values at each collision velocity are arranged on a straight line of $T=248.6+13.73\ V^{-0.329}$, and the representative CT value is 248.6.

Although FIGS. 9 and 10 show the results of ten measurements while changing the collision velocity, generally, the CT value of the golf club head 30 is calculated by about three measurements (three velocity levels).

Returning to the description of FIG. 14, the characteristic distribution creation unit 510 creates a distribution of the stiffness characteristics in the measurement range M set in the horizontal plane based on the stiffness characteristics calculated for each measurement point.

In the present embodiment, for example, as illustrated in FIG. 12A, the distribution of the stiffness characteristics is visualized as a contour diagram in which small regions corresponding to each measurement point are color-coded according to the CT values at each measurement point.

In FIG. 12A, the region including the CT values (value rounded to the first decimal place) of 0 to 240, the region including 241 to 252, the region including 253 to 264, and the region including 265 or more are displayed in different colors. In the example of FIG. 12A, it can be seen that the region including the CT value of 265 or more exists at one location on each side of the measurement range M. Further, it can be seen that the CT value is not always large at the central portion of the measurement range M, that is, the central portion of the face surface 32.

As a result, the distribution of the stiffness characteristics within the measurement range M can be easily understood, and the performance evaluation of the golf club head 30 can be efficiently performed.

The representation of the stiffness distribution is not limited to the contour diagram, and various conventionally known representations can be adopted.

The feature point extraction unit 512 extracts a feature point of the stiffness characteristics based on the distribution of the stiffness characteristics in the measurement range M created by the characteristic distribution creation unit 510.

The feature point of the stiffness characteristics is, for example, a point (measurement point) where the largest value or the smallest value of the stiffness characteristic value is taken within the measurement range M, and a point (measurement point) where the maximum value or the minimum value is taken. The maximum value (or minimum value) is a point corresponding to the largest value (or smallest value) of each peak when the stiffness characteristic value has a plurality of peaks.

In general, the largest value of the CT value is a problem. Therefore, in the example of FIG. 12A, paying attention to the largest value or the maximum value, the point where the largest value of the CT value is taken within the measurement range M is 7A, having 275 (274.529). Further, the maximum value in the region including a CT value of 265 or more, which exists at one location on each side, is 275 (274.529) of 7A in the left region and 270 (270.233) of 8O in the right region.

Next, the measurement procedure by the stiffness characteristic measurement device 10 will be described with reference to the flowchart of FIG. 7.

Figure 7:
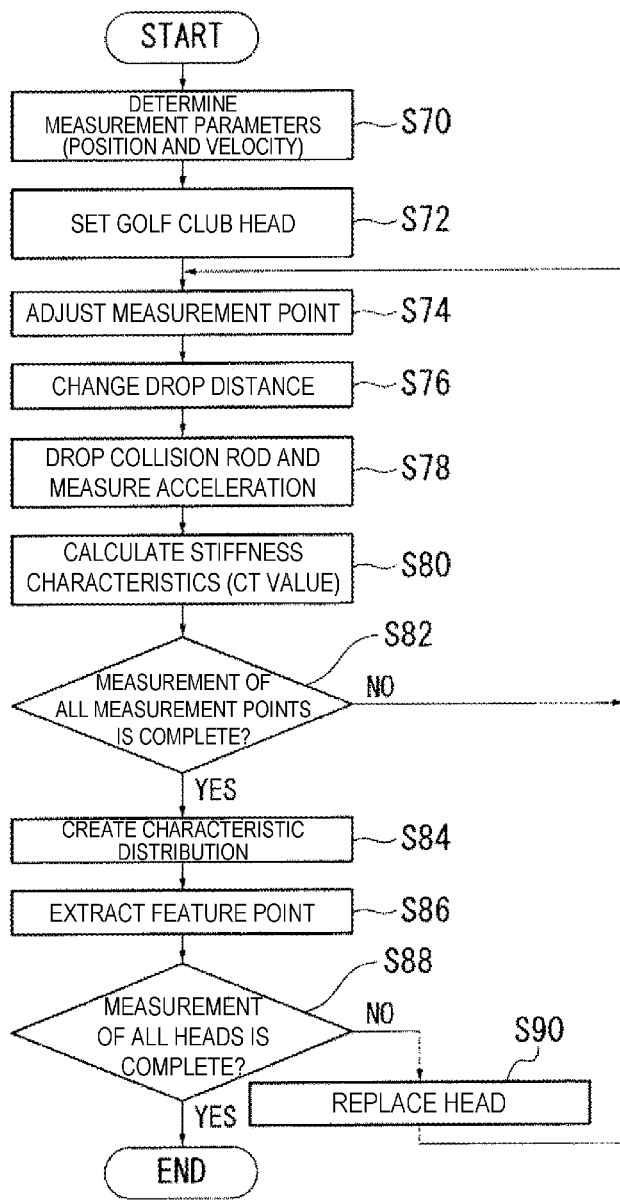
FIG. 7 is a flowchart illustrating a measurement procedure by the stiffness characteristic measurement device 10.

In the flowchart of FIG. 7, it is assumed that a plurality of mass-produced golf club heads 30 having the same model number are prepared, and the stiffness characteristics (for example, CT values) of each golf club head 30 are measured. In the flowchart of FIG. 7, Method 2 described above is used to determine the drop distance by the drop distance changing unit 504.

Prior to the measurement, measurement parameters such as the measurement point of the stiffness characteristic (collision position of the collision rod 24 on the face surface 32), the collision velocity of the collision rod 24, and the separation distance between the collision rod 24 and the measurement point are determined (step S70).

Next, the golf club head 30 is set on the head fixing jig 12 (step S72).

More specifically, first, the measurer moves the XY stage 14 on the rail 1604 toward the front. This is to move the head fixing jig 12 to a position where the golf club head 30 does not interfere with the linear bush 22 or the like when the golf club head 30 is set. Next, the side portion 35 side is fitted into the fitting hole 1208 with the face surface 32 of the golf club head 30 facing upward. Then, the XY stage 14 on the rail 1604 is moved in the back direction (toward the Z stage 18). When the XY stage 14 moves to the end of the rail 1604, the position of the XY stage 14 is fixed by the magnet.

Next, the measurement point adjustment unit 502 outputs a control signal to the XY stage 14 so that the first measurement point (for example, 1A in FIG. 12A) is located at the drop position of the collision rod 24. As a result, the XY stage 14 operates, and the measurement point is located at the drop position of the collision rod 24 (step S74, measurement point adjustment step).

Subsequently, the drop distance changing unit 504 measures the separation distance (drop distance) between the tip of the collision rod 24 and the measurement point by using a distance sensor (not illustrated), and changes the position of the arm 20 so as to correspond to the separation distance set in step S70 (step S76, drop distance changing step).

The drop control unit 506 drives the motor 2704 of the cam mechanism 27 to drop the collision rod 24 on the measurement point. Further, a series of accelerations from the drop to the collision are measured by the accelerometer 26 (step S78).

FIGS. 5A-5D are diagrams schematically illustrating the behavior of the collision rod 24 at the time of measurement.

From the viewpoint of visibility, the cam mechanism 27 is not illustrated in FIGS. 5C and 5D.

As illustrated in FIG. 5A, at the time of measurement, the lever 2410 of the collision rod 24 is pulled upward by the cam 2702. In the present embodiment, the lower stopper 2408 is positioned below the lower surface 2208 of the linear bush 22 even when the collision rod 24 is pulled up by the cam 2702.

At the time of measurement, the spring 28 is inserted through the rod body 2404 of the collision rod 24. The spring 28 is located on the upper surface 2206 of the linear bush 22. In the state of FIG. 5A, since no force is applied to the spring 28, the length of the spring 28 is a natural length H0.

As illustrated in FIG. 5B, when the cam 2702 rotates and separates from the lever 2410, the collision rod 24 freely drops in the vertical direction, and the drop velocity is accelerated by gravitational acceleration.

Subsequently, when the upper stopper 2406 drops to the upper end position of the spring 28, the load (mass×acceleration) of the collision rod 24 is applied to the spring 28. Due to this load, the spring 28 contracts to a length H1 that is shorter than the natural length H0 (see FIG. 5C). On the other hand, the reaction force from the spring 28 is applied to the collision rod 24, and the drop velocity decelerates. In the process of this deceleration, the collision rod 24 collides with the face surface 32 at a predetermined collision velocity.

The collision rod 24 that collides with the face surface 32 is subject to a reaction force and moves upward. When the collision rod 24 moves upward, the load applied to the spring 28 disappears, and the spring 28 returns to the natural length H0. After moving upward by a certain distance, the collision rod 24 drops again downward (in the direction of the face surface 32) due to the gravity. However, since the drop start position is lower than that at the time of the first drop, the load applied to the spring 28 is small, and the load does not reach the extent that the spring 28 is contracted (or the amount of contraction is smaller than that in FIG. 5C).

Therefore, as illustrated in FIG. 5D, the bottom surface 2412 of the collision rod 24 is held above the face surface 32. That is, the spring 28 functions as a re-collision prevention mechanism that holds the collision rod 24 (colliding object) above the face surface 32 (measurement target surface) to prevent the collision rod 24 from re-colliding with the face surface 32 after the collision rod 24 collides with the face surface 32.

The reason why such a re-collision prevention mechanism is provided is to prevent noise in the detection value of the accelerometer 26 from increasing due to re-collision.

Returning to the description of FIG. 7, the stiffness characteristic calculation unit 508 calculates the stiffness characteristic (CT value) of the golf club head 30 using the acceleration detected in step S78 (step S80).

Until the measurement at all the measurement points set on the golf club head 30 to be measured this time is complete (step S82: NO), the process returns to step S74, the measurement point is moved, and the measurement and the calculation of the stiffness characteristic are continued.

When the measurement at all the measurement points is complete (step S82: YES), the characteristic distribution creation unit 510 plots the values of the stiffness characteristics at each measurement point on the contour diagram and creates the distribution of the stiffness characteristics in the measurement range M (step S84, characteristic distribution creation step).

The feature point extraction unit 512 identifies the feature point of the stiffness characteristics (measurement point where the largest value or the maximum value is taken) based on the distribution of the stiffness characteristics (step S86, feature point extraction step).

Until all the measurements of the plurality of prepared golf club heads 30 are complete (step S88: NO), the golf club head 30 set in the head fixing jig 12 is replaced (step S90), the process returns to step S74, and subsequent processing is repeated.

Then, when all the measurements of the plurality of prepared golf club heads 30 are complete (step S88: YES), the processing according to this flowchart ends.

Figure 11:
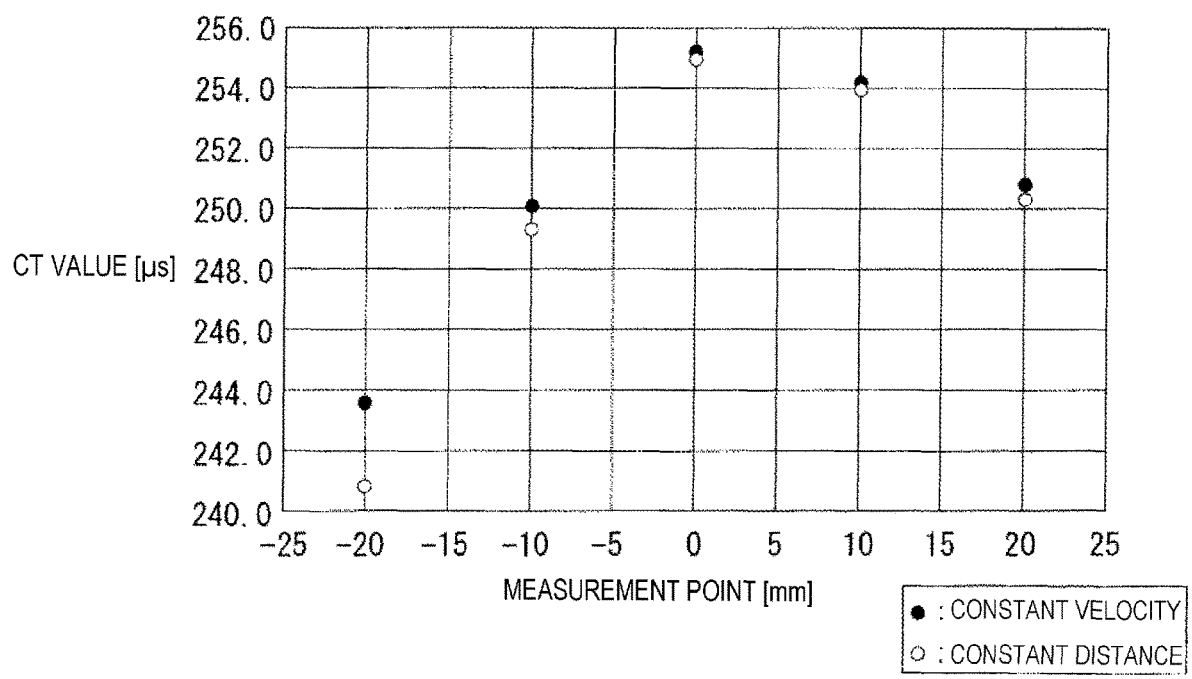
FIGS. 11A-11B are explanatory diagrams illustrating a difference in CT values depending on the presence or absence of a drop distance changing step.

FIGS. 11A-11B provide explanatory diagrams showing the difference in CT value depending on the presence or absence of the drop distance changing step.

FIG. 11A shows CT values measured at points separated by predetermined distances in the up-down direction from the center position (measurement point 0) of the face surface 32 of the golf club head 30 as measurement points (hitting point positions). FIG. 11B is a graph in which the values of FIG. 11A are plotted, in which the vertical axis is the CT value, and the horizontal axis is the measurement point.

As the measurement points, the center position (measurement point 0) of the face surface 32, points separated 10 mm and 20 mm from the measurement point 0 in the upward direction, and points (−10 mm) and (−20 mm) separated 10 mm and 20 mm from the measurement point 0 in the downward direction were set.

When the drop start height of the collision rod 24 was constant with respect to the measurement point 0 without performing the drop distance change process (when measured at all measurement points from the height at which the collision velocity became 0.40 m/s at the measurement point 0), the collision velocity was slower than 0.40 m/s at other measurement points, for example, was 0.33 m/s at the measurement point −20 mm. The CT value was the largest at the measurement point 0, and became smaller as the distance from the measurement point 0 increased.

On the other hand, when the drop distance change process was carried out and the drop start height of the collision rod 24 was changed so that the collision velocity became 0.40 m/s at all the measurement points, the CT value became smaller at all measurement points as compared with the case where the drop start height was constant. Since the CT value has velocity dependence as described above, the CT value measured at a constant collision velocity is considered to be more reliable. In particular, the larger the distance from the measurement point 0, the larger the error due to the influence of the curvature of the face surface 32. Therefore, it is effective to carry out the measurement by performing the drop distance changing step.

Further, since the face surface 32 has a curvature, the normal direction at each point of the face surface 32 is also different. In order to measure the stiffness characteristics more accurately, the collision angle of the collision rod 24 is desirably consistent (vertical) at respective measurement points.

Therefore, a collision angle adjustment mechanism 80 that adjusts the holding angle of the golf club head 30 (collision target object) so that the drop direction of the collision rod 24 (colliding object) and the normal direction of the measurement point of the face surface 32 substantially coincide with each other may be provided to execute a collision angle adjustment step.

Figure 15:
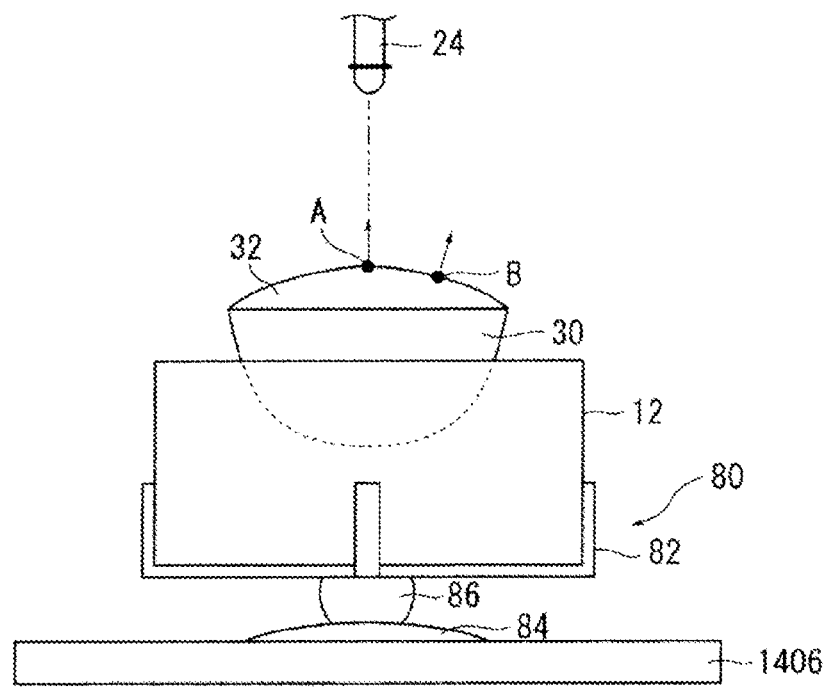
FIGS. 15A-15B are explanatory diagrams illustrating an example of a collision angle adjustment mechanism 80.
Figure 15:
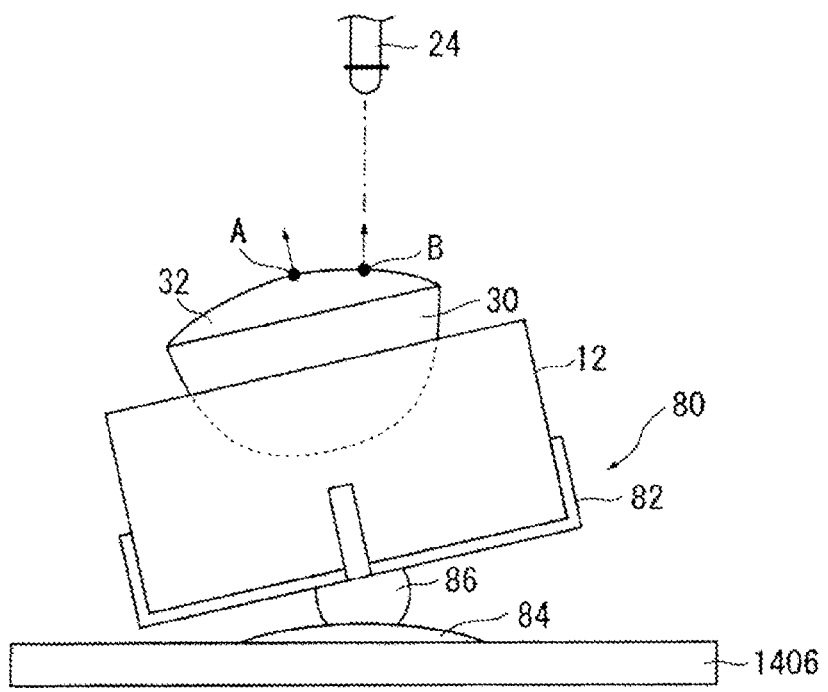

FIGS. 15A-15B are explanatory diagrams illustrating an example of the collision angle adjustment mechanism 80.

The collision angle adjustment mechanism 80 includes a grasping portion 82 that grasps the head fixing jig 12, a ground contact portion 84 that is arranged on a flat surface (the Y-axis table 1406 in the example of FIGS. 15A-15B), and a rotating portion 86 that rotates the grasping portion 82 at an arbitrary angle.

The grasping portion 82 that grasps the head fixing jig 12 includes a base portion that is formed in a cross shape and is in contact with the bottom surface of the head fixing jig 12, and an upright portion extending vertically upward from the ti p of the base portion and in contact with the side surfaces 1204 and 1206 of the head fixing jig 12.

In the state of FIG. 15A, the drop direction of the collision rod 24 and the normal direction of the measurement point A at the substantial center of the face surface 32 (indicated by the arrow from the measurement point A) coincide with each other. On the other hand, the normal direction of the measurement point B at the end of the face surface 32 (indicated by the arrow from the measurement point B) deviates from the drop direction of the collision rod 24.

Therefore, when measuring at the measurement point B, the grasping portion 82 is rotated by the rotating portion 86 so that the drop direction of the collision rod 24 and the normal direction of the measurement point B coincide with each other as illustrated in FIG. 15B.

The normal direction of each measurement point is calculated from, for example, the design data of the golf club head 30.

As a result, the stiffness characteristics at each measurement point on the curved surface can be measured with higher accuracy.

As described above, the stiffness characteristic measurement device 10 according to the embodiment adjusts the drop distance of the collision rod 24 so that the collision velocity of the collision rod 24 toward the measurement point is substantially constant each time the measurement point on the face surface 32 is changed. Thus, the collision velocity at each measurement point can be made substantially constant even when the face surface 32 has a curvature, which is advantageous in improving the measurement accuracy when, for example, the stiffness characteristic has velocity dependence.

When the stiffness characteristic measurement device 10 adjusts the drop distance by calculating the collision velocity by using the accelerometer 26 used for measuring the stiffness characteristics (Method 1 described above), this is advantageous in reducing the cost required for carrying out the drop distance changing step.

When the stiffness characteristic measurement device 10 measures the separation distance between the collision rod 24 and the measurement point to adjust the drop distance (Method 2 described above), this is advantageous in adjusting the drop distance quickly and performing measurement efficiently.

When the stiffness characteristic measurement device 10 adjusts the holding angle of the collision target object so that the drop direction of the collision rod 24 and the normal direction of the measurement point substantially coincide with each other, this is advantageous in further improving the measurement accuracy of the stiffness characteristics.

The stiffness characteristic measurement device 10 measures the stiffness characteristics while changing the relative position between the collision rod 24 and the golf club head 30 along two orthogonal axes in the horizontal plane, and this is advantageous in continuously measuring the stiffness characteristics of the golf club head 30.

The stiffness characteristic measurement device 10 creates the distribution of the stiffness characteristics in the measurement range set in the horizontal plane based on the stiffness characteristics calculated for a plurality of measurement points, and this is advantageous in understanding the stiffness characteristics of the entire golf club head 30.

The stiffness characteristic measurement device 10 extracts the feature point of the stiffness characteristics based on the distribution of the stiffness characteristics, and this is advantageous in evaluating the stiffness characteristics of the golf club head 30.

The stiffness characteristic measurement device 10 can easily and highly accurately measure the CT value, which is important as an evaluation index of the golf club head 30.

Since the stiffness characteristic measurement device 10 drops the collision rod 24, which is a colliding object, in the vertical direction toward the golf club head 30, which is a collision target object, it is easy to maintain the collision position and the collision angle of the collision rod 24 at a constant, which is advantageous in improving the measurement accuracy of the stiffness characteristics.

In the stiffness characteristic measurement device 10, since the collision rod 24 is columnar, it is easy to regulate the movement path along the longitudinal direction, and it becomes easier to maintain the collision position and the collision angle of the collision rod 24 at a constant. This is advantageous in further improving the measurement accuracy of the stiffness characteristics.

Since the bottom surface 2412 (colliding surface) of the collision rod 24 is formed into a spherical shape, measurement compliant with the pendulum test can be performed.

Since the stiffness characteristic measurement device 10 is provided with the upper stopper 2406 and the lower stopper 2408 (stopper mechanisms) that regulate the uppermost point position and the lowest point position of the collision rod 24, the drop distance of the collision rod 24 can be maintained at a constant, which is advantageous in maintaining the collision velocity at the face surface 32 at a constant.

The stiffness characteristic measurement device 10 is provided with the spring 28 (re-collision prevention mechanism) for preventing the collision rod 24 from re-colliding with the face surface 32, and this is advantageous in alleviating the influence on the measurement due to repeated collision in a short time. Since the collision rod 24 is kept above the face surface 32, the work efficiency when replacing the golf club head 30 to be measured can be improved, and scratches or the like on the face surface 32 can be prevented.

The stiffness characteristic measurement device 10 is provided with a drop distance adjustment mechanism (the position fixing mechanism 2006 of the arm 20) for adjusting the distance between the drop start position of the collision rod 24 and the face surface 32 (drop distance of the colliding object). Therefore, the collision velocity of the collision rod 24 can be adjusted to an arbitrary velocity, and the convenience in measuring the stiffness characteristic having velocity dependence can be improved.

Since the stiffness characteristic measurement device 10 can adjust the drop position of the collision rod 24 on the face surface 32, it is possible to measure the stiffness characteristics at an arbitrary position on the face surface 32.

In the stiffness characteristic measurement device 10, since the head fixing jig 12 is formed to include a vibration damping material, it is possible to prevent excessive noise from being added to the detection value of the accelerometer 26, which is advantageous in performing stable measurement.

Since the stiffness characteristic measurement device 10 can use only the golf club head 30 to which no shaft is attached as the collision target object, the CT value can be easily measured in the trial production process and the manufacturing process of the golf club head 30.

In the present embodiment, the CT value is calculated as the stiffness characteristics of the golf club head 30, but other stiffness characteristics that can be calculated using the detection value of the accelerometer 26, such as the coefficient of restitution (ratio of relative velocity before and after collision), may be calculated.

The invention claimed is:

1. A stiffness characteristic measurement method of holding a collision target object with a measurement target surface facing upward, dropping a colliding object vertically toward the measurement target surface, and calculating stiffness characteristics of the collision target object based on a detection value of an accelerometer attached to the colliding object, the method comprising:
   a drop distance changing step of adjusting a drop distance of the colliding object so that a collision velocity of the colliding object at a measurement point is substantially constant each time the measurement point on the measurement target surface is changed.

2. The stiffness characteristic measurement method according to claim 1, wherein
   the drop distance changing step involves integrating an acceleration signal obtained by the accelerometer to calculate the collision velocity, and adjusting the drop distance of the colliding object so that the collision velocity is within a predetermined range.

3. The stiffness characteristic measurement method according to claim 1, wherein
   the drop distance changing step involves measuring a separation distance between the colliding object and the measurement point before the dropping and adjusting the drop distance of the colliding object so that the separation distance is constant.

4. The stiffness characteristic measurement method according to claim 1, further comprising:
a collision angle adjustment step of adjusting a holding angle of the collision target object so that a drop direction of the colliding object and a normal direction of the measurement point substantially coincide with each other.

5. The stiffness characteristic measurement method according to claim 1, further comprising:
a measurement point adjustment step of changing the measurement point on the measurement target surface by changing a relative position between the colliding object and the collision target object; and
a stiffness characteristic calculation step of dropping the colliding object on the measurement point and calculating the stiffness characteristics at each of the measurement points based on the detection value of the accelerometer at the time of the dropping, wherein
the measurement point adjustment step involves changing the relative position between the colliding object and the collision target object by predetermined distances along two orthogonal axes in a horizontal plane.

6. The stiffness characteristic measurement method according to claim 5, further comprising:
a characteristic distribution creation step of creating a distribution of the stiffness characteristics in a measurement range set in the horizontal plane based on the stiffness characteristics calculated for the measurement points.

7. The stiffness characteristic measurement method according to claim 6, further comprising:
a feature point extraction step of extracting a feature point of the stiffness characteristics based on the distribution of the stiffness characteristics in the measurement range created in the characteristic distribution creation step.

8. The stiffness characteristic measurement method according to claim 1, wherein
the collision target object is a golf club head, and
the stiffness characteristic is a CT value of the golf club head.

9. A stiffness characteristic measurement device that measures stiffness characteristics of a collision target object, comprising:
a holding mechanism that holds the collision target object with a measurement target surface facing upward;
a dropping mechanism that drops a colliding object vertically toward the collision target object;
an accelerometer attached to the colliding object;
a characteristic calculation unit that calculates stiffness characteristics of the collision target object based on a detection value of the accelerometer; and
a drop distance changing unit that adjusts a drop distance of the colliding object so that a collision velocity of the colliding object at a measurement point is substantially constant each time the measurement point on the measurement target surface is changed.

10. The stiffness characteristic measurement device according to claim 9, wherein
the drop distance changing unit integrates an acceleration signal obtained by the accelerometer to calculate the collision velocity and adjusts the drop distance of the colliding object so that the collision velocity is within a predetermined range.

11. The stiffness characteristic measurement device according to claim 9, wherein
the drop distance changing unit measures a separation distance between the colliding object and the measurement point before the dropping and adjusts the drop distance of the colliding object so that the separation distance is constant.

12. The stiffness characteristic measurement device according to claim 9, further comprising:
a collision angle adjustment unit that adjusts a holding angle of the collision target object so that a drop direction of the colliding object and a normal direction of the measurement point substantially coincide with each other.

13. The stiffness characteristic measurement device according to claim 9, further comprising:
a measurement point adjustment unit that changes the measurement point on the measurement target surface by changing a relative position between the colliding object and the collision target object; and
a stiffness characteristic calculation unit that drops the colliding object on the measurement point and calculates the stiffness characteristics at each of the measurement points based on the detection value of the accelerometer at the time of the drop, wherein
the measurement point adjustment unit changes the relative position between the colliding object and the collision target object by predetermined distances along two orthogonal axes in a horizontal plane.

14. The stiffness characteristic measurement device according to claim 13, further comprising:
a characteristic distribution creation unit that creates a distribution of the stiffness characteristics in a measurement range set in the horizontal plane based on the stiffness characteristics calculated for the measurement points.

15. The stiffness characteristic measurement device according to claim 14, further comprising:
a feature point extraction unit that extracts a feature point of the stiffness characteristics based on the distribution of the stiffness characteristics in the measurement range created by the characteristic distribution creation unit.

16. The stiffness characteristic measurement device according to claim 9, wherein
the collision target object is a golf club head, and
the stiffness characteristic is a CT value of the golf club head.

* * * * *